May 21, 1957  T. P. NELLIGAN  2,792,644
MALTING APPARATUS
Filed Dec. 1, 1954  6 Sheets-Sheet 6
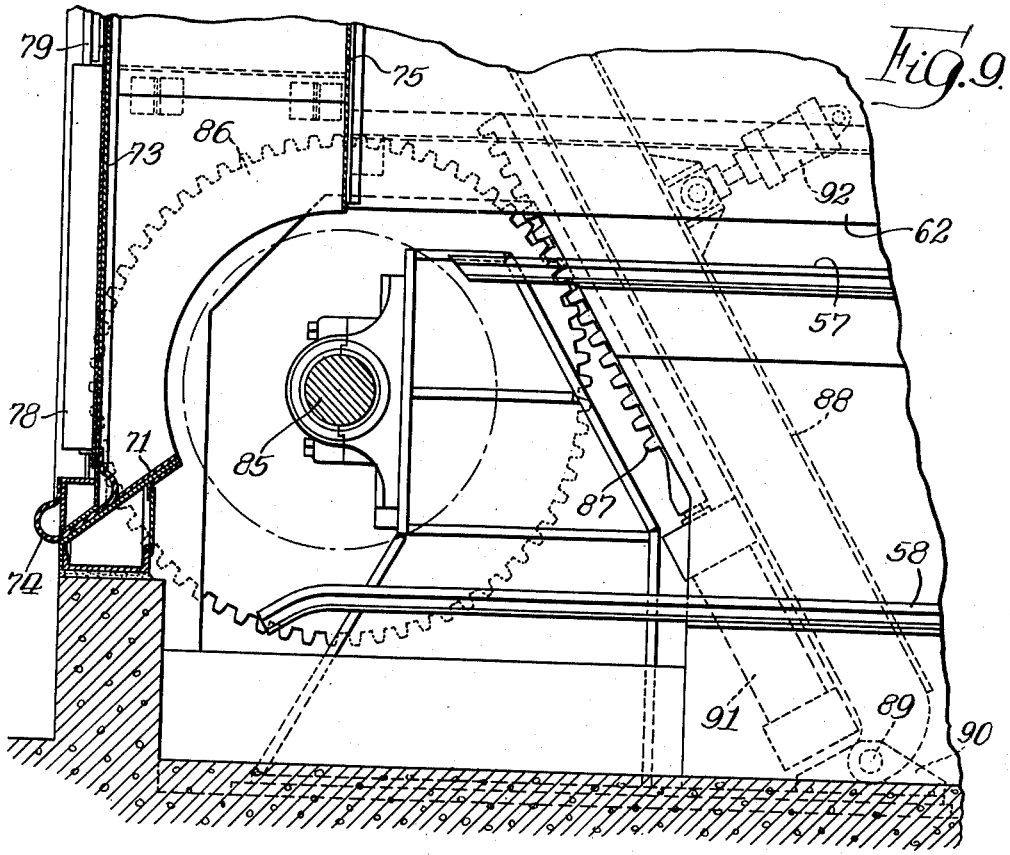
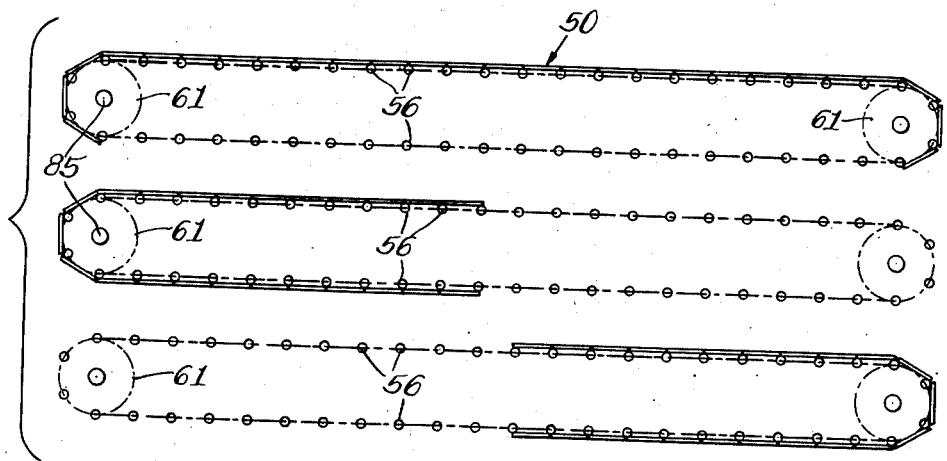
INVENTOR.
Thomas P. Nelligan,
BY Schroeder, Hofgren,
Brady & Wegner
Attys.

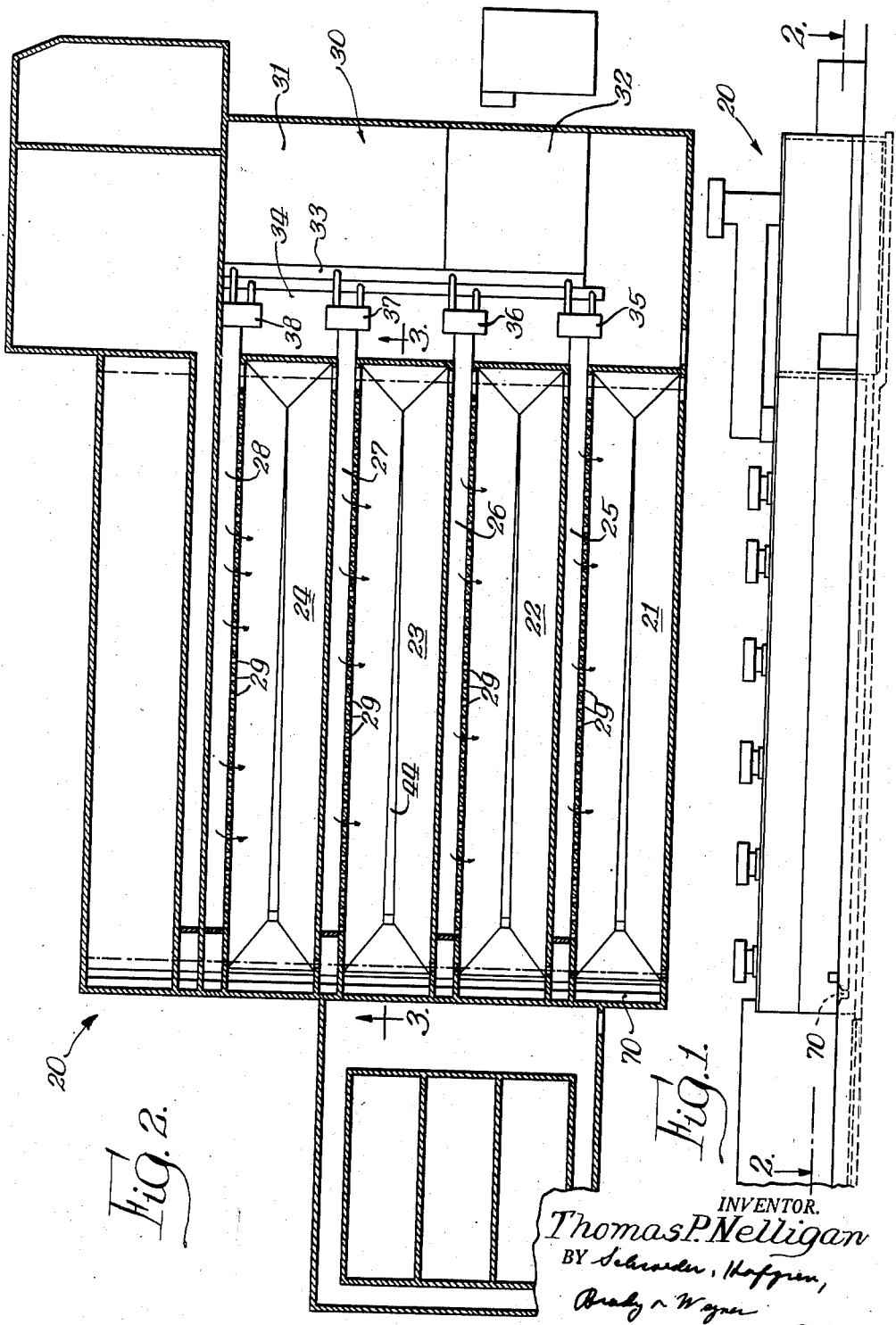

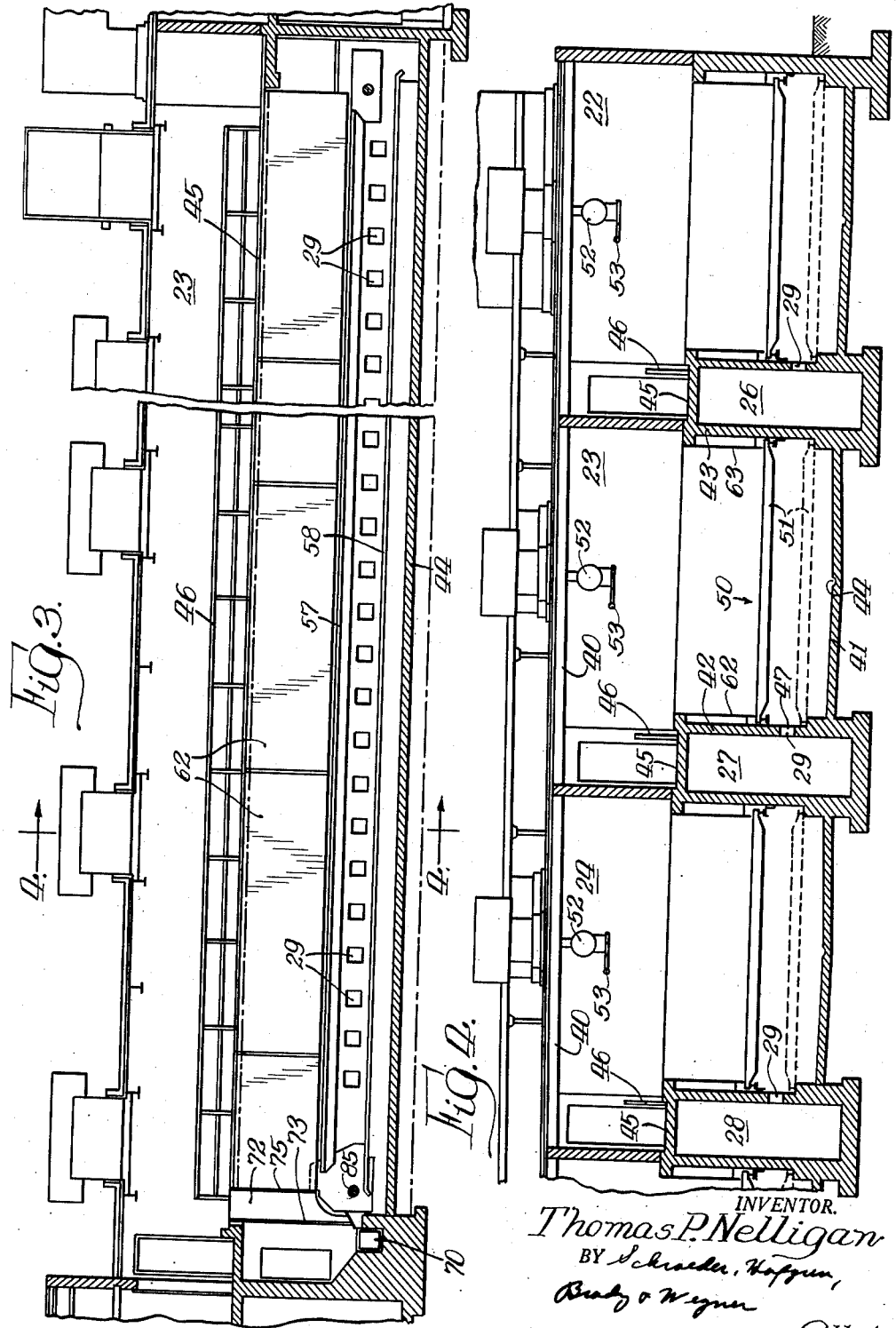

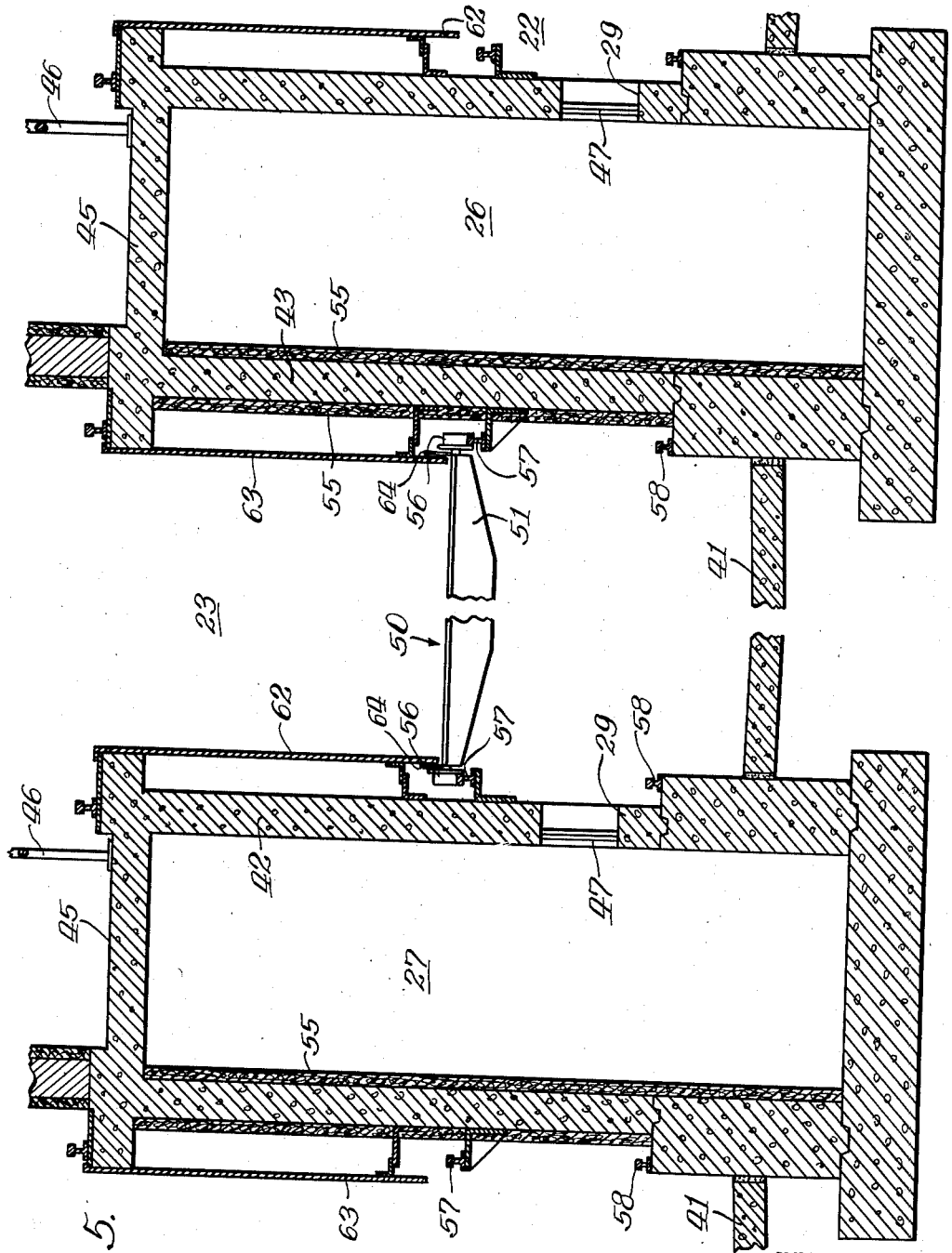

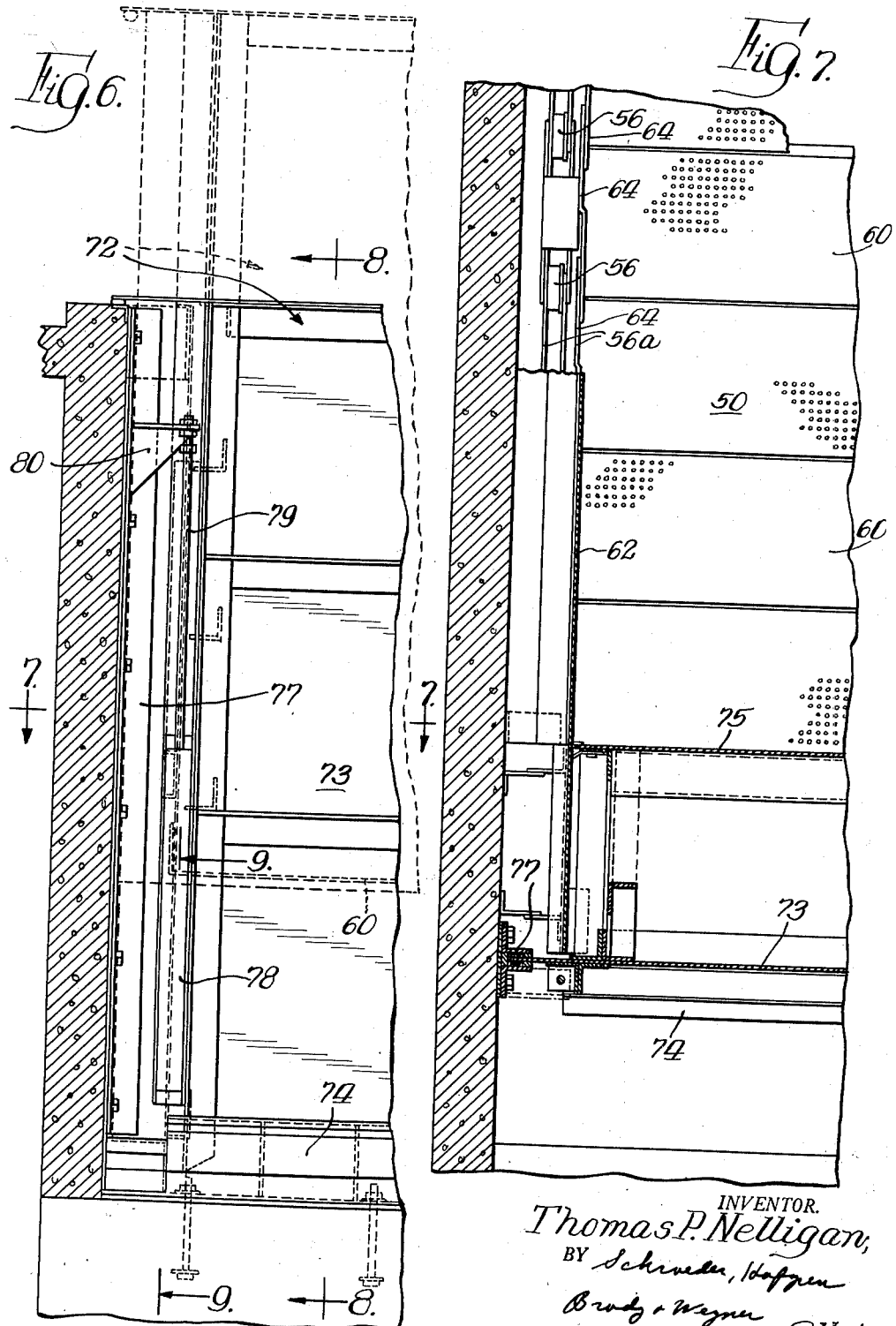

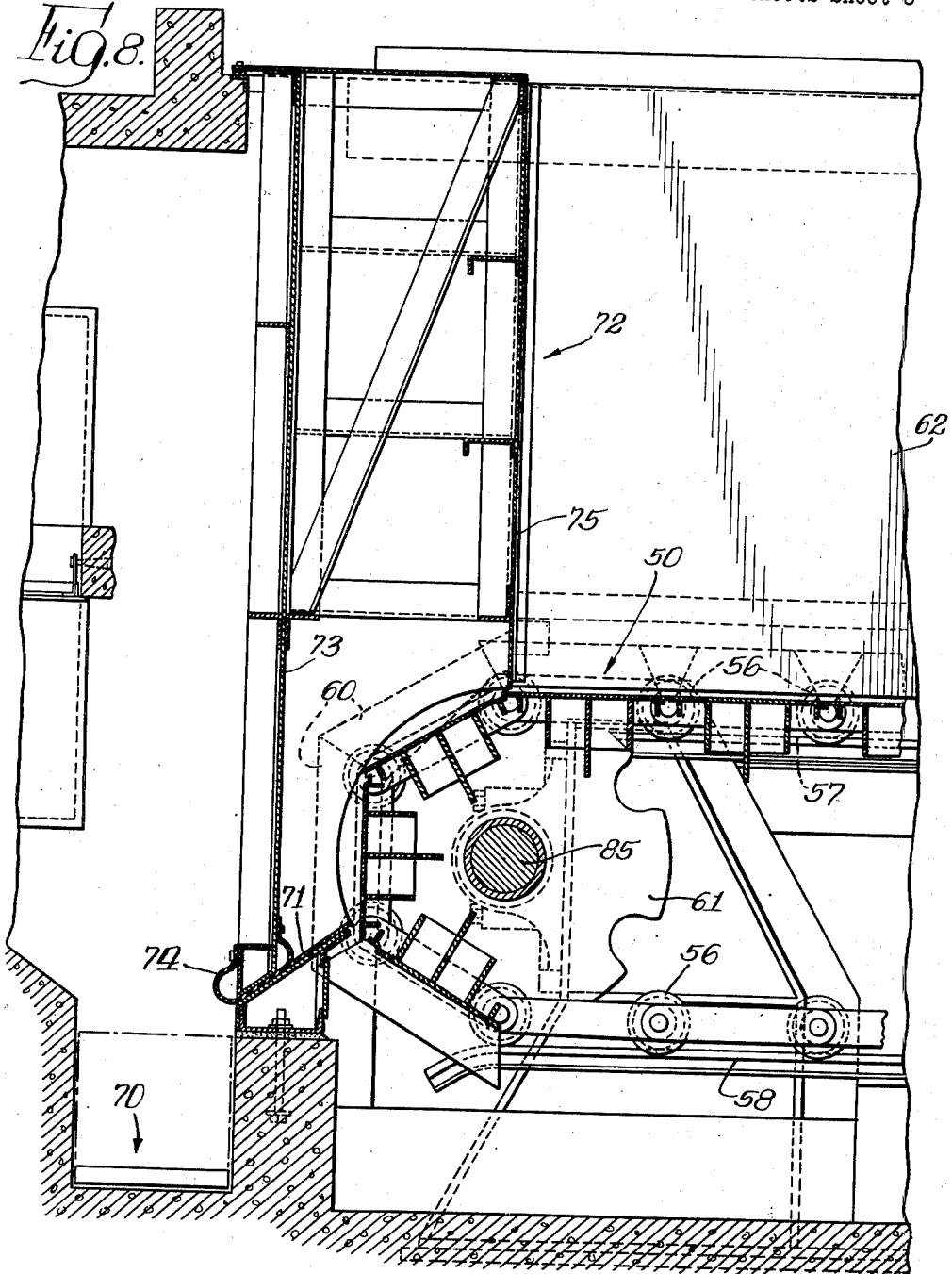

United States Patent Office

2,792,644
Patented May 21, 1957

2,792,644

MALTING APPARATUS

Thomas P. Nelligan, Deerfield, Ill., assignor to Albert Schwill & Company, a corporation of Illinois Application December 1, 1954, Serial No. 472,435

10 Claims. (Cl. 34—210)

This invention relates to grain treating apparatus and more particularly to an apparatus for malting grains such as barley.

It is the general object of the present invention to produce a new and improved apparatus for treating grain.

It is a more specific object of the invention to produce a new and improved apparatus for malting barley.

In the process of producing malt from barley it has been the common practice to treat the barley through three principal processing steps; namely, steeping, germinating and kilning.

In the steeping process the barley is soaked in water for a period of time sufficient to ensure penetration of the water into the barley grain itself and to remove impurities therefrom. The steeped barley is then transferred to a germinating compartment where it is maintained for several days until germination has been completed to the desired degree. Upon initially being introduced into the germinating compartment, the barley is first normally subjected to currents of warmed air to initiate the germinating process, but as the latter process is an exothermic reaction, cooled air is introduced into the barley as germination progresses to prevent overheating.

After the germination has progressed to the desired point, it is then necessary to halt further germination and this has been done by transferring the germinated barley to a kilning compartment wherein it is subjected to elevated temperatures to arrest and finally halt further germination.

In carrying out the process just described it has been the custom to provide a relatively large germinating area divided into a number of germinating compartments which are kept constantly in use. Any compartment where germination has completed and where the barley therefrom has been emptied into a kilning compartment is shortly thereafter refilled with fresh barley direct from the steeping tanks.

There are a number of disadvantages to the foregoing process. In the first place, not all barleys react identically under identical conditions and the malt maker must constantly check on the germinating progress made by any particular batch of barley in a germinating compartment to be sure it is germinating at the desired speed to produce malt of the highest quality. If the batch is germinating too rapidly, it must be further cooled, while if it is germinating too slowly it should not be cooled as much and may even need to be heated slightly. Where in the former process all of the germinating compartments occupy a single large area, it is extremely difficult if not impossible to treat each batch individually without affecting the germinating process in adjoining compartments and, as a result, the batch in each compartment is treated more or less on an average basis; that is, is subjected to the temperature conditions maintained in the entire germinating area.

A further disadvantage of the former process is the amount of grain handling required. A relatively large amount of heavy equipment is needed to transfer the barley from the germinating compartment, for example, to the kilning compartment. Such handling of the barley is not only expensive, but is injurious to the grain itself, as such handling may cause damage to the malt.

According to the present invention, however, there is provided malting apparatus which not only eliminates certain of the handling operations previously required, but also permits individual treatment of each batch of barley during the germinating process. For this purpose there is provided a plurality of germinating compartments each isolated from the other and each provided with means for controlling the conditions under which the barley is caused to germinate. Each of the several batches in the various germinating compartments may be subjected to the precise conditions required to produce germination at the proper rate and in the proper time so that a uniformly high quality malt may be produced from each germinating compartment. Such control over each compartment can be achieved without in any way affecting the control over an adjoining compartment.

Furthermore, with apparatus of the present invention it is possible, after completion of the germination, to effect kilning in the same compartment in which germination took place so that it is no longer necessary to effect any form of transfer of the grain between the two steps in the malt making process. This ability of the present apparatus to effect both germinating and kilning in the same compartment arises by reason of the individual control of conditions permitted in each of the compartments. Furthermore, grain in each compartment is supported on a foraminous support or apron which is carried by an endless chain and thus is movable in the compartment so that after completion of the kilning operation the malt may readily be dumped from the apron into a suitable conveyor for transportation to storage. In addition, where the apron is made movable in the manner just described, it can be constructed with a length approximately equal to the length of the compartment so that it can be moved to a first position uncovering one half of the length of the compartment and then to a second position uncovering the other half of the compartment, thus permitting cleaning of the entire compartment without the necessity of workmen attempting to work beneath an overlying apron.

While the foregoing brief description has indicated the general advantages of the present invention, other and further advantages of the invention will be apparent to those skilled in the art when consideration is given to the following description and drawings in which—

Fig. 1 is a side elevational view of a malting house embodying the invention;

Fig. 2 is a horizontal sectional view through the malting house of Fig. 1 and taken generally along line 2—2 thereof;

Fig. 3 is an enlarged vertical section taken lengthwise of a single compartment and along line 3—3 of Fig. 2;

Fig. 4 is a vertical section taken along line 4—4 of Fig. 3;

Fig. 5 is a further enlarged vertical section taken through the lower portion of the apparatus shown in Fig. 4;

Fig. 6 is a vertical section showing the gate mechanism at one end of a compartment;

Fig. 7 is a horizontal section along line 7—7 of Fig. 6;

Fig. 8 is a vertical section taken along line 8—8 of Fig. 6;

Fig. 9 is a vertical section at the gate end of the compartment showing the drive mechanism for the apron and taken along line 9—9 of Fig. 6; and Fig. 10 is a schematic view of the carrier chain and movable apron showing the apron in several positions.

While this invention is susceptible of embodiments in many different forms, there is shown in the drawings and will herein be described in detail one specific embodiment, with the understanding that the present disclosure is to be considered as an exemplification of the principles of the invention and is not intended to limit the invention to the embodiment illustrated. The scope of the invention will be pointed out in the appended claims.

Referring now to Figs. 1 and 2, there is shown a malting house, generally designated 20, divided by suitable partitions into four compartments designated 21, 22, 23, and 24. A duct for introducing air into the compartments is provided for each compartment and designated on Fig. 2 as 25, 26, 27, and 28, respectively. Each duct is provided with a plurality of openings indicated at 29 so that air under pressure introduced into a duct may flow into its respective compartment. Each of the openings 29 is provided with means to control the flow of air therethrough, such means preferably taking the form of a sliding door.

For introducing conditioned air into the ducts, there is provided at one end of the malting house 20 suitable air conditioning apparatus generally indicated as 30, such apparatus comprising a suitable heater 31 for heating air, a cooler 32 for cooling air, together with a pair of headers 33 and 34 connected to the heater and cooler respectively. For each duct there is provided a blower designated 35, 36, 37, and 38, respectively, each provided with suitable controllable connections to the headers 33 and 34, so that air at the right temperature and under the right conditions may be introduced under pressure into each duct for flow into the proper compartment.

Referring now to Figs. 3 and 4, it will be seen that each compartment is provided with a top wall 40, a bottom wall 41 and side walls 42 and 43, the reference numerals being applied to the compartment 23 and similar partitions are provided for each of the other compartments. The bottom wall 41 is inclined inwardly towards its center where there is located a drain 44 for draining water from the compartment. It will be noted that the ducts previously mentioned are defined by concrete walls with each duct having a top, the upper side of which provides a catwalk 45 extending along the length of the compartment and guarded by a suitable guard rail 46. As previously noted, the openings 29 from the duct into the compartment are controllable through the medium of sliding doors 47.

In each compartment there is provided a flexible foraminous apron 50 extending horizontally from end to end of the compartment with the apron being reinforced by suitable underlying beams 51 extending crosswise thereof so as to enable the apron to carry a batch of barley thereon during the germinating and kilning processes. Each apron 50 has a length approximately equal to the length of the compartment and, when in the position shown in the upper figure of Fig. 10, is in position to receive barley from the steep tanks. Preferably the barley is introduced into the compartment through a header 52 extending along the top wall of the compartment for substantially its entire length and provided at intervals with controllable valves 53 which may be opened to permit the barley-water mixture from the steep tanks to flow therethrough onto the surface of the apron 50. Normally the grain is flowed onto the apron to a depth of about three or four feet, with such depth being substantially uniform from end to end of the compartment.

As will be noted from an examination of Fig. 5, the side wall 43 separates the compartment 23 from the duct 26, which duct is for the purpose of supplying conditioned air to the adjoining compartment 22. To prevent transfer of heat from the compartment 23 to the adjoining duct 26, the side wall 43 is provided on either side with insulation 55.

The apron 50 is provided at intervals along its length with supporting rollers 56 interconnected by links 56a to form a pair of endless carrier chains, one extending along each side of the apron. The rollers 56 ride upon tracks 57 extending longitudinally along the entire length of the compartments and immediately above a second pair of tracks 58 having a similar extent. As will be noted from an inspection of Fig. 8, the apron 50 is made up of a plurality of foraminous sections 60. The carrier chain is constructed to engage suitably conformed sprocket wheels 61 provided in pairs at each end of the compartment and means later to be described are provided for rotating the sprocket wheels thereby to move the apron lengthwise of itself and to cause it to assume the various positions within the chamber illustrated in Fig. 10.

Referring again to Fig. 5, it will be noted that the apron, when in the position of the uppermost illustration of Fig. 10, serves to divide the chamber into two sections, an upper section above the apron and a lower section below the apron, and it will be further noted that the openings 29 associated with the compartment 23 are located so as to introduce air into the lower section of the compartment. It is desired that the air flow upwardly in the compartment passing through the foraminous apron and filtering upwardly through the barley to maintain the conditions therein substantially uniform during the malting process. To prevent such air from passing around the side edges of the apron (and hence not through the grain carried thereby) sealing means are provided extending along the length of the compartment and serving to prevent such undesired air flow. For this purpose vertically positioned plates 62 and 63 are provided in each compartment and are mounted so as to have their lower edges closely adjacent the upper surface of the apron. At their upper portions the sealing plates are sealed to abutments on the opposite side walls so as to provide a dead air space therebehind and thus effectively preventing flow upwardly in the compartment except through the apron. The plates 62 and 63, being preferably of stainless steel, are corrosion resistant and thus less liable to deterioration after periods of use, but also are capable of giving up any heat quite readily. In the kilning step of the process, the temperature in the compartment is raised to a relatively high level and held at such level until germination has been halted. Concrete walls have a tendency to retain such heat for a longer period and thus would delay the introduction of a new batch into the compartment until the walls had cooled. The stainless steel plates 62 and 63, however, cool off quite rapidly and thus do not cause such delay.

As the grain flows quite readily, means are provided for preventing leakage of the grain beneath the lower edge of the sealing plates 62 and 63 and therefore each of the apron sections 60 is provided with a side wing 64 along each side thereof and so shaped to partially overlap the side wing on the preceding and following apron sections and shown in Fig. 7. The side wings are mounted so as to be closely adjacent the exterior surface of the sealing plates and by such proximity to prevent grain from flowing off the apron under the edge of the side plate.

To provide an effective means for emptying each compartment upon the completion of the kilning operation, the apron may be moved lengthwise of itself with such movement serving to dump the grain carried thereby as the apron moves from a position wherein it is riding on the upper tracks 57 to one where it is riding on the lower tracks 58. As the apron is moved in the manner described, the grain falling off the forward end thereof is guided by a suitable guide means at one end of the compartment into a conveyor 70, with the guide means providing an inclined plate 71 extending completely across said end of the compartment and serving in the manner of a chute to direct the barley falling from the apron into the conveyor 70. As will be noted in Fig. 2, the conveyor 70 preferably is a single unit extended all the way across the end of the malting house and thus services all of the compartments therein. As the conveyor is positioned to communicate with each compartment, means must be provided for isolating each compartment from the conveyor except during the period when the grain in the compartment is being dumped into the conveyor. For this purpose there is provided a gate mechanism designated 72 which is slideably mounted at the end of the compartment adjacent the conveyor and is provided with a first portion 73 in the form of a vertical plate carrying at its lower end a flexible seal 74 positioned sealingly to engage the chute 71 when the gate is in closed position and to be moved upwardly away from the chute when the gate is in opened position. The gate is provided with a second part in the form of a vertical plate 75 positioned to have its lower edge closely adjacent the upper surface of the apron 50 when the gate is in closed position and thus serves as a wall at said end of the compartment against which the barley may be piled as it is loaded onto the upper surface of the apron.

As can be seen from an inspection of Figs. 6 and 7, the side edge portions of the plates 73 are carried in suitable guide flanges 77 positioned one on either side of the compartment, and vertical movement of the gate is achieved through a pair of hydraulic motors, one on each side of the gate. The motors preferably take the form of a hydraulic piston and cylinder device 78 having a connecting rod 79 fixed to a bracket 60 mounted on the side wall. The cylinder 78 is itself connected to the gate portion 73 so that introduction of hydraulic fluid into the upper end of the cylinder causes the gate to move from the closed position shown in solid lines shown in Fig. 6 to the position shown in the dotted lines therein.

The sprocket wheels 61 at the conveyor end of the compartment are fixed to a rotatably mounted shaft 85 which carries a large pinion gear 86 mounted exteriorly of the compartment. Suitable sealing means are provided around the shaft 85 so as to maintain the isolation of the compartment while rotating the pinion gear 86. There is also provided a rack 87 slideably mounted in an arm 88 pivotally mounted at 89 to a suitable bracket 90 fixed to the floor of the malting house. A piston and cylinder device 91 is connected to the rack 87 for reciprocating the same and a second piston and cylinder device 92 is connected to the arm 88 for rocking the same about its pivot so as to move the rack in and out of engagement with the pinion. Suitable sources of hydraulic fluid under pressure and timing mechanisms are provided so as to move the rack into engagement with the pinion 86 and then move the rack longitudinally of itself to cause a corresponding rotation of the pinion. At the end of such longitudinal movement of the rack, the piston and cylinder device 92 is actuated to rock the arm 88 and hence withdraw the rack from engagement with the pinion, whereupon the device 91 is operated to return the rack to the intial position. By reason of the foregoing drive an intermittent step by step motion for the apron is provided.

In carrying out malting operations in the apparatus thus described, the drive mechanism is operated to move the apron 50 to the position shown in the upper figure of Fig. 10. With the apron halted in this position, the barley-water mixture from the steep tanks may be introduced into the compartment from the header 52 and distributed along the length of the apron by means of the valves 53. Excess water may drain through the barley and apron and be removed from the barley compartment along the drain channel 44. During the introduction of the barley, the gate 72 is, of course, closed.

To initiate the germinating process, warmed air from the heater 31 is forced by the appropriate blower into the proper duct and introduced through the openings 29 into the section of the compartment below the apron. The introduction of heated air is continued until the germination has reached the desired point whereupon it may be discontinued and subsequently followed by the introduction of cooled air from the air cooler 32 to maintain the proper germinating conditions within the compartment. The amount and temperature of the air introduced may easily be varied from time to time during the germinating process so as to cause the germination to proceed at the desired rate. During the germination, suitable conventional agitators may be used for continuously agitating and mixing the barley as it rests upon the upper surface of the apron.

When germination is completed, quite hot air may be introduced into the lower section of the compartment to kiln the grain and hence halt germination.

Upon completion of the kilning step, the gate 72 may be opened and the drive means started to move the apron lengthwise of itself in the compartment toward the chute 71 to cause the grain to fall from the apron and be directed by the chute into the conveyor 70. When the apron has reached the position shown in the intermediate figure of Fig. 10, it will be noted that the entire right hand end of the compartment has been uncovered and suitable cleaning operations may take place in that end while the grain is still being dumped. Movement of the apron may be continued to dump all of the grain and then continued further until the apron occupies the position shown in the lower figure of Fig. 10, wherein it will be noted that the left hand end of the compartment has now been uncovered and may then be cleaned. Continued operation of the drive means will eventually return the apron to its upper position ready to receive a new batch of barley from the steep tanks for germinating and kilning.

From the foregoing description it will be noted that individual control for the batch of barley in each compartment may be provided with the treatment of the grain in one compartment having no effect on the treatment of the grain in the adjoining compartment. Furthermore, the barley in any compartment may be kilned when germination has proceeded to the desired degree without reference to the progress of germination taking place in any other compartment and, furthermore, without waiting its turn to be moved into a separately provided kilning compartment. Clearly any number of compartments may be arranged in the manner shown.

I claim:

1. Malting apparatus comprising a plurality of parallel elongated compartments each having a bottom wall and a top wall, a common side wall isolating each compartment from the adjacent compartment, an endless carrier in each compartment movably mounted along each side wall with each carrier having upper and lower flights, a foraminous apron carried by the carrier and having a length substantially equal to the length of the compartment, said apron when extending from end to end of the compartment serving to divide the compartment into an upper section above the apron and a lower section below the apron, motor means for driving the carrier to move the apron lengthwise of the compartment, means defining a duct extending through said common side wall and having a plurality of openings opening into one of the compartments below the upper flights of the carriers therein, means for introducing air into the duct under pressure for flow through said openings into said lower section and thence through the apron into the upper section of each compartment, a conveyor at one end of each compartment, a gate at said end of each compartment and separating each compartment from the conveyor, and means for opening each gate to permit grain carried by the aprons to be dumped into the conveyor with movement of their respective carriers.

2. Malting apparatus comprising an elongated, isolated compartment having a bottom wall, side walls and a top wall, a pair of drive sprockets adjacent each end of the compartment and mounted for rotation about parallel axes, a pair of endless carrier chains, each carried by one drive sprocket in each pair and having upper and lower flights extending substantially from end to end of the compartment, a foraminous apron carried by the carrier chains and having a length substantially equal to the length of the compartment, motor means for driving the sprockets to move the apron lengthwise of the compartment, means defining a duct extending along a side wall of the compartment and having a plurality of openings opening into the compartment below the upper flight of the carrier chain, means for introducing conditioned air into the duct under pressure for flow through said openings and into the compartment beneath the apron when the apron is carried by said upper flight to direct said air upwardly through grain on the apron, a conveyor at one end of the compartment, a guide at said end of the compartment providing a chute extending across the compartment and inclining downwardly toward the conveyor, and a gate at said end of the compartment and movable from an open position permitting grain on the apron to fall to the chute and be guided thereby into the conveyor when said apron is moved toward the gate, to a closed position in contact with said guide to close off said end of the compartment.

3. Malting apparatus comprising an elongated compartment having a bottom wall, side walls and a top wall, a foraminous apron mounted for movement lengthwise of the compartment and having a length at least equal to the length of the compartment, said apron when extending from end to end of the compartment serving to divide the compartment into an upper section above the apron and a lower section below the apron, a duct for introducing air under pressure into said lower section, a vertically arranged plate extending along each side wall in spaced relation thereto, said plate having its lower edge positioned immediately adjacent the upper surface of the apron, means providing a seal between the plate and the adjacent side wall whereby the air entering the compartment through said duct is caused to flow upwardly through said apron and through grain carried on said apron.

4. Malting apparatus comprising an elongated compartment having a bottom wall, side walls and a top wall, a foraminous apron mounted for movement lengthwise of the compartment and having a length at least equal to the length of the compartment, said apron when extending from end to end of the compartment serving to divide the compartment into an upper section above the apron and a lower section below the apron, a duct extending along a side wall of the compartment and having a plurality of controllable openings for introducing air under pressure into said lower section, a vertically arranged plate extending along each side wall in spaced relation thereto, said plate having its lower edge positioned immediately adjacent the upper surface of the apron, means providing a seal between the upper edge of the plate and the adjacent side wall whereby the air entering the compartment through said duct is caused to flow upwardly through said apron and through grain carried on said apron, a conveyor at one end of the compartment, and means for moving the apron lengthwise of said compartment to transfer grain thereon to said conveyor.

5. Malting apparatus comprising an elongated compartment having a bottom wall, side walls and a top wall, a foraminous apron mounted for movement lengthwise of the compartment and having a length at least equal to the length of the compartment, said apron when extending from end to end of the compartment serving to divide the compartment into an upper section above the apron and a lower section below the apron, a duct extending along a side wall of the compartment and having a plurality of controllable openings for introducing air under pressure into said lower section, a vertically arranged plate extending along each side wall in spaced relation thereto, said plate having its lower edge positioned immediately adjacent the upper surface of the apron, means providing a seal between the upper edge of the plate and the adjacent side wall whereby the air entering the compartment through said duct is caused to flow upwardly through said apron and through grain carried on said apron, a gate at said end of the compartment and separating the compartment from the conveyor, and means for opening the gate to permit grain carried by the apron to be dumped into the conveyor with lengthwise movement of the apron.

6. Malting apparatus comprising an elongated compartment having a bottom wall, side walls and a top wall, a foraminous apron mounted for movement lengthwise of the compartment and having a length at least equal to the length of the compartment, said apron extending from end to end of the compartment and serving to divide the compartment into an upper section above the apron and a lower section below the apron, a duct for introducing air under pressure into said lower section, a conveyor at one end of the compartment, a guide at said end of the compartment and providing a chute extending across the compartment and inclining downwardly toward the conveyor, a two part vertically movable gate at said end of the compartment having a first part adapted to make sealing engagement with said chute and a second part adapted to upstand vertically from the portion of the apron at said end of the compartment, and means for moving said gate upwardly from a closed position in which said first part is in sealing engagement with said chute to isolate said compartment and said second part extends substantially vertically upwardly from the apron portion to an open position permitting grain on said apron to fall onto said chute and be guided thereby into the conveyor.

7. Malting apparatus comprising an elongated compartment having a bottom wall, side walls and a top wall, a foraminous apron horizontally mounted in the compartment for movement lengthwise of the compartment and having a length at least equal to the length of the compartment, said apron serving to divide the compartment into an upper section above the apron and a lower section below the apron, means providing a source of cooled air and a source of heated air, a duct extending along the length of said compartment and provided with a plurality of controllable openings each opening into said lower section, selectively operable means for introducing into said duct cooled air and heated air from said sources whereby cooled air may be directed into said duct for flow upwardly through said apron and through grain germinating on said apron the germination thereof and thereafter heated air introduced into said duct and lower section for passage through said grain to kiln the same upon the completion of the germination process, a gate at one end of said compartment mounted for movement from a closed position isolating said compartment to an open position, and means for moving said apron to cause the grain thereon to be dumped through the opening provided by the opened gate.

8. The apparatus of claim 7 in which said means for moving the apron comprising a rotatably mounted drive shaft having a portion within the compartment and a portion exterior thereof, a sprocket on the portion of the shaft within the compartment, an endless carrier chain engaging said sprocket and carrying said apron, a pinion on the portion of the shaft exterior of the compartment, a reciprocably mounted rack to engage the pinion, motor means for reciprocating the rack, a means for moving said rack in and out of engagement with the pinion intermittently to rotate the shaft with reciprocation of the rack.

9. In a malting apparatus having an isolated germinating compartment, an apron in the compartment and mounted for movement lengthwise thereof, drive means for moving the apron comprising a rotatably mounted drive shaft having a portion within the compartment and a portion exterior thereof, a sprocket on the portion of the shaft within the compartment, an endless carrier chain engaging said sprocket and carrying said apron, a pinion on the portion of the shaft exterior of the compartment, an arm pivotally mounted adjacent the last mentioned portion of the shaft, a rack reciprocably mounted on the arm and positioned to engage the pinion, a hydraulic piston and cylinder device connected to the rack for reciprocating the same and a second hydralic piston and cylinder device connected to said arm to pivot the same to move the rack into and out of engagement with the pinion.

10. Malting apparatus comprising an elongated compartment having a bottom wall, side walls and a top wall, a foraminous apron in the compartment having a length at least equal to the length of the compartment and comprising a plurality of sections hingedly secured together and mounted for movement lengthwise of the compartment, said apron when extending from end to end of the compartment serving to divide the compartment into an upper section above the apron and a lower section below the apron, a duct for introducing air under pressure into said lower section, a vertically arranged plate extending along each side wall in spaced relation thereto, said plate having its lower edge positioned immediately adjacent the upper surface of the apron and with its upper edge forming an airtight seal with the adjacent side wall, and a side wing plate on each side edge of each of said apron sections and extending upwardly immediately adjacent said sealing plate to cooperate therewith to prevent flow of grain over the side edges of the apron.

References Cited in the file of this patent

UNITED STATES PATENTS

| Number | Name | Date |
|---|---|---|
| 481,958 | Krause | Sept. 6, 1892 |
| 624,245 | Prinz | May 2, 1899 |
| 660,408 | Wolf | Oct. 23, 1900 |
| 715,314 | Starkey | Dec. 9, 1902 |
| 826,886 | Rice | July 24, 1906 |
| 841,939 | Cooke | Jan. 22, 1907 |
| 1,613,042 | Lykken | Jan. 4, 1927 |
| 2,304,692 | Hurxthal et al. | Dec. 8, 1942 |
| 2,336,698 | Morrill | Dec. 14, 1943 |
| 2,459,463 | Simpson | Jan. 18, 1949 |